June 10, 1924.
T. REID ET AL
POWER TRANSMISSION
Filed May 11, 1923   3 Sheets-Sheet 3
1,497,119
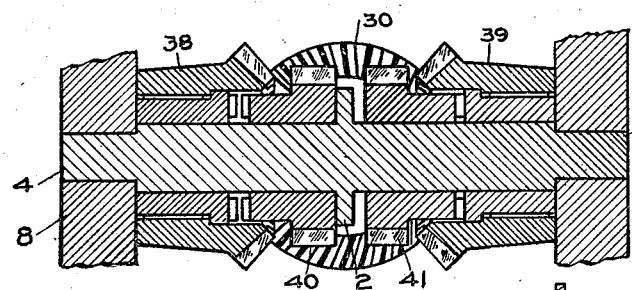
FIG. 8.
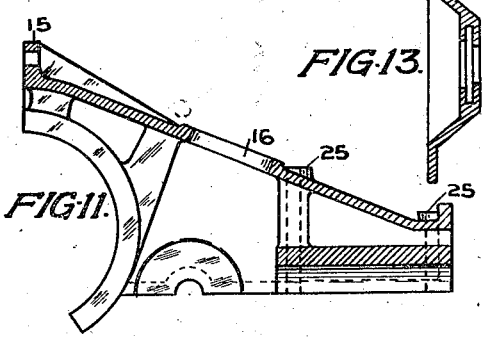
FIG. 10   FIG. 11.   FIG. 13.   FIG. 12.
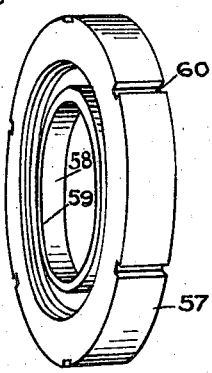
FIG. 15.
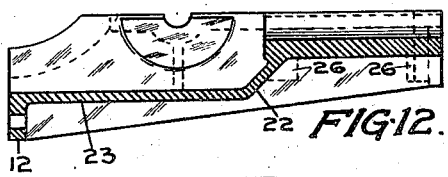
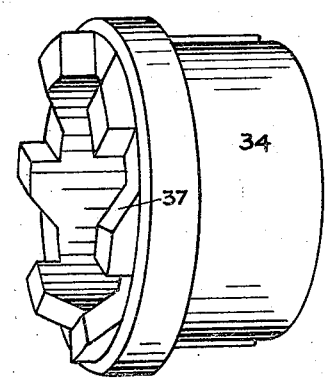
FIG. 9.
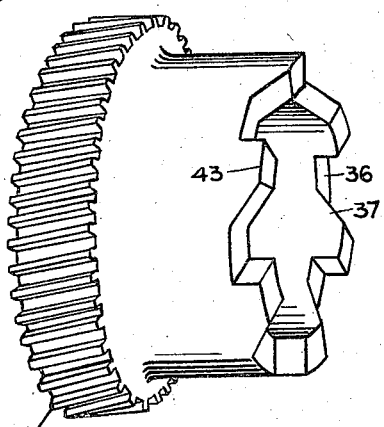
FIG. 16.   FIG. 14.
Inventor
T. Reid & N.J. Finlayson
By E.J. Fetherstonhaugh
Attorney Patented June 10, 1924.

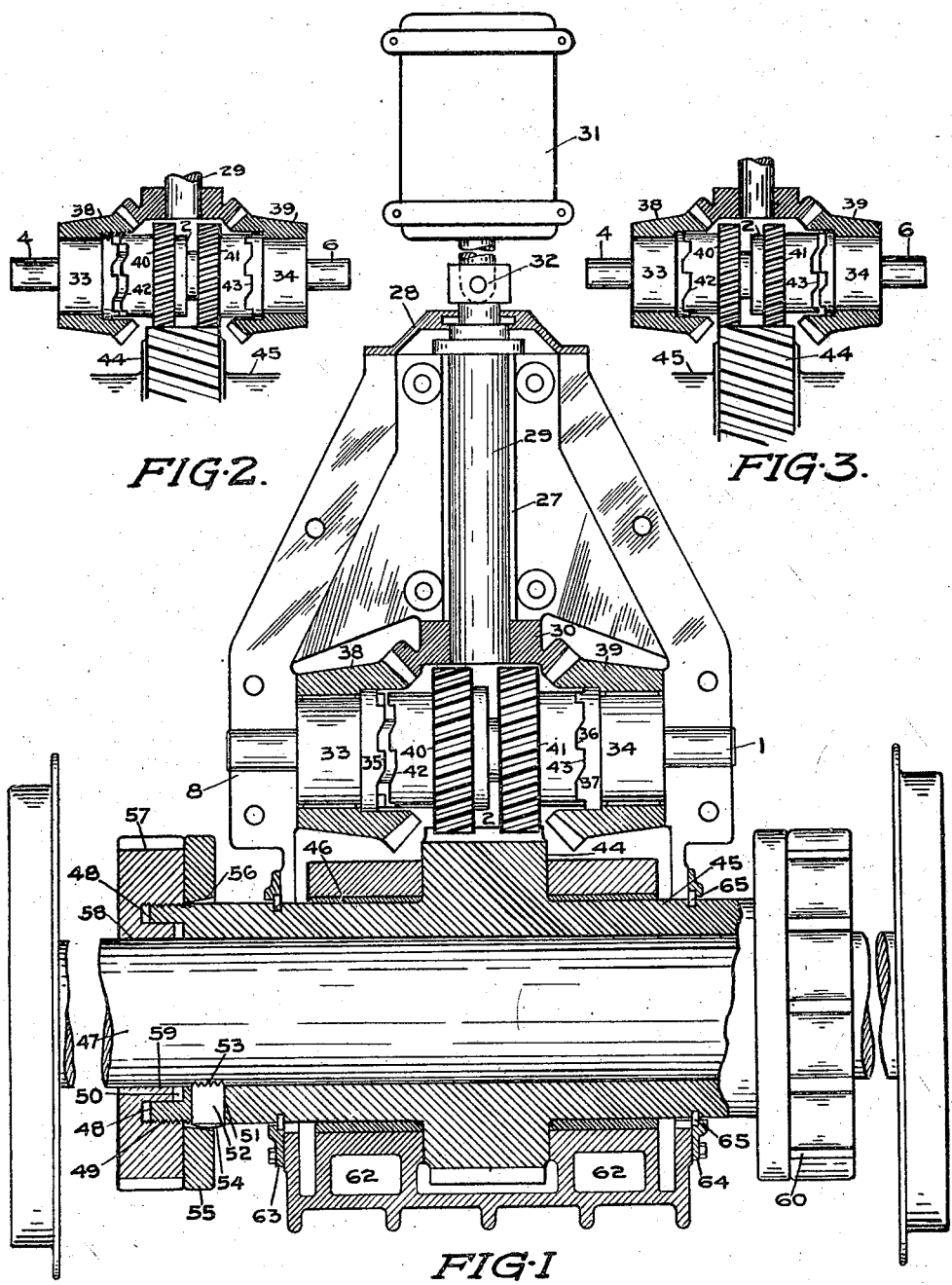

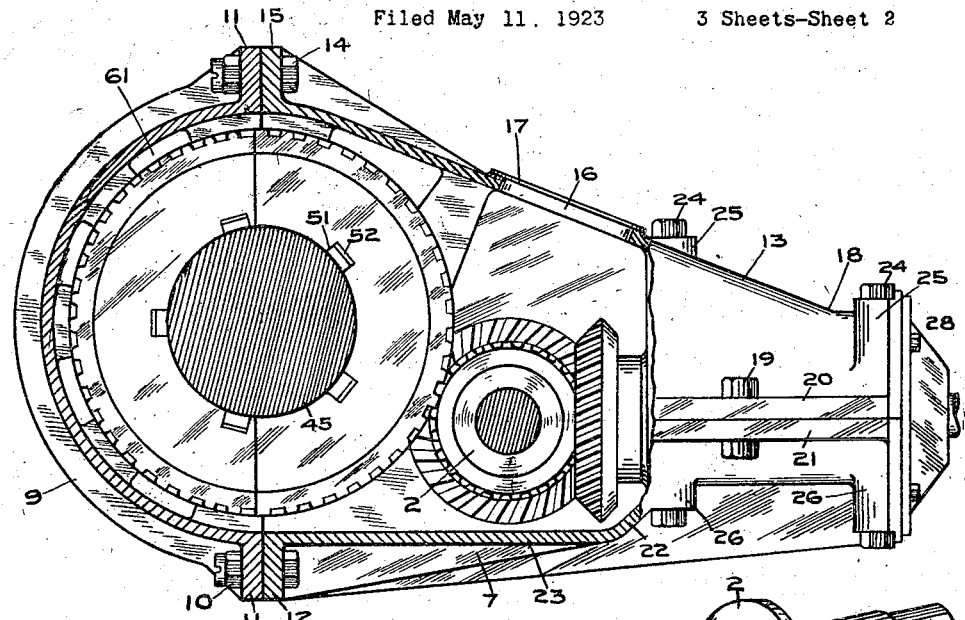
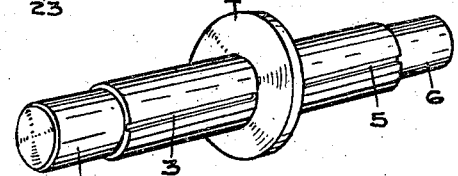
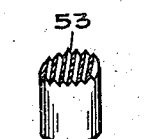
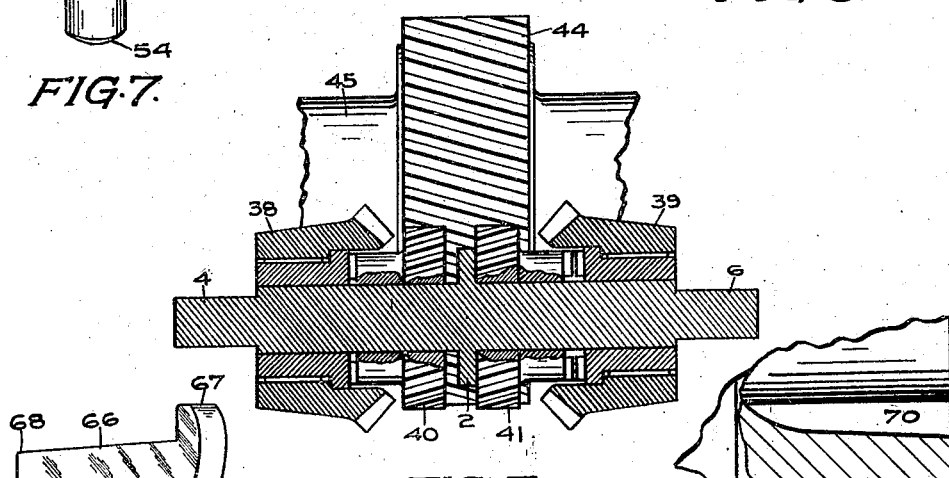
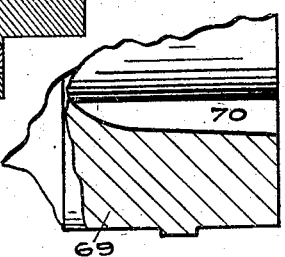

1,497,119

UNITED STATES PATENT OFFICE.

THOMAS REID AND NORMAN TERRILL FINLAYSON, OF DUNDAS, ONTARIO, CANADA, ASSIGNORS TO PITT RAILWAY EQUIPMENTS LIMITED, OF MONTREAL, QUEBEC, CANADA.

POWER TRANSMISSION.

Application filed May 11, 1923. Serial No. 638,275.

*To all whom it may concern:*

Be it known that we, THOMAS REID and NORMAN TERRILL FINLAYSON, subjects of the King of Great Britain, and residing in the town of Dundas, in the Province of Ontario, in the Dominion of Canada, have invented a new and useful Improvement in Power Transmissions, of which the following is the specification.

The invention relates to a power transmitting device as described in the present specification and shown in the accompanying drawings that form part of the same.

The invention consists essentially of the novel features pointed out broadly and specifically in the claims for novelty following a description containing an explanation in detail of an acceptable form of the invention.

The objects of the invention are to insure the rotation of the driven machine continuously in the one direction, notwithstanding the change of direction in the rotation of the driving shaft or axle and thereby in electric generators and like machines materially aid the regulation of the output, as well as reduce the cost of maintenance in the running of the machine; to facilitate the operation of the electric lighting in steam railway cars; to maintain lighting equipments in passenger service in good order and at a reasonable charge; to eliminate belt drives in under car work; and generally to provide a simple, economical and efficient transmission.

In the drawings Figure 1 is a plan view of the transmission partially in section.

Figure 2 is a detail showing the operating gears clutched on the one side for one direction of rotation.

Figure 3 is a detail showing the operating gears clutched on the other side for the other direction of rotation.

Figure 4 is a longitudinal sectional view of the casing partially closed in at the end showing the driving in elevation and one set of bevelled spiral gears.

Figure 5 is a cross sectional view of the transmission showing the spiral driving gear and pinions.

Figure 6 is a perspective detail of the intermediate shaft.

Figure 7 is a perspective detail of a centering dog.

Figure 8 is a cross sectional view of the transmission showing the bevel gears.

Figure 9 is a perspective detail of a clutch and mounting for a bevel gear.

Figure 10 is a sectional detail of the head of the casing.

Figure 11 is a sectional detail of the upper body of the casing.

Figure 12 is a sectional detail of the lower body of the casing.

Figure 13 is a sectional detail of the cap of the casing.

Figure 14 is a perspective detail of the wedge ring for the centering dogs.

Figure 15 is a perspective detail of the wedge ring driving member.

Figure 16 is a detail of a driving pinion and clutch extension.

Figure 17 is a detail of another form centering wedge dog.

Figure 18 is a fragmentary view of hub showing dog recess for dog illustrated in Figure 17.

Like numerals of reference indicate corresponding parts in the various figures.

Referring to the drawings, the intermediate shaft 1 is formed with the central annular flange 2 forming a gear stop and the longitudinal keyways 3 diametrically opposite to one another on the one side of the stop 2 and extending to the reduced journal end 4 and the opposite keyways 5 extending from said stop 2 to the journal end 6.

The journal ends 4 and 6 are supported in the walls of the bowl 7 of the casing and more particularly in the bearings 8 in said walls.

The front of the bowl 7 is closed in by the head plate 9 which is suitably curved and shaped for the enclosed gearing, and is rigidly secured to said bowl 7 by the bolts 10 through the flanges 11 and 12 of said head and bowl respectively.

The cover 13 of the casing is joined to said head by the bolts 14 through the flanges 11 and 15 of said head and cover respectively and is formed with an opening 16 for inspection lubrication and repair purposes and closed by the plate 17.

The cover 13 tapers to the tail end 18 of the casing and is joined to the bowl 7 by the bolts 19 through the flanges 20 and 21 from the lower and upper ends of said cover and bowl respectively.

The bowl 7 is dipped at 22 at the beginning of the body portion 23 to form a receptacle for the lubricating substance and is further held to the cover 13 securely by the tie bolts 24 through the bosses 25 on the cover and 26 on the bowl.

The longitudinal bearing 27 extends the full length of the tail portion 18 and the latter is closed in by the cap 28 having a shaft orifice for the transmission shaft 29 journalled in the bearing 27 and carrying at its inner end the spiral bevel gear 30 and at its outer end driving the machine 31 through the universal joint 32.

The clutch members 33 and 34 are mounted in fixed positions within the body portion 23 of the casing on the shaft 1 and practically constitute enlargements of said shaft just inside the journal ends 4 and 6 and are formed with the teeth 35 and 36 on their inner sides of similar formation and having slanting backs 37 to permit the rotation of the coacting member in a contrary direction.

The spiral bevel gears 38 and 39 are fixedly mounted on the clutch members 33 and 34 and are in constant engagement with the bevel gear 30, consequently on driving one or other of the bevel gears 38 or 39 the transmission shaft 29 will be driven and no matter which one is doing the driving there will be no change whatsoever in the direction of rotation of said transmission shaft.

The pinions 40 and 41 are rigid with or form part of the clutch members 42 and 43 respectively and are spiral or formed with the teeth at an angle to their axis and slidably mounted on the shaft in the keyways 3 and 5 respectively, these pinions 40 and 41 being permanently separated by the annular flange 2 forming on each of its sides a gear stop in order to maintain each of said pinions to its respective side and within operative distance of its coacting clutch member.

The driving gear 44 forms part with or is rigidly secured to the elongated hub and is formed with its teeth at an angle to its axis or of the spiral type, said hub 45 turning in the sleeve 46 in the casing and fixedly mounted on the axle 47, the latter supporting said casing.

The gear 44 drives the pinions 40 and 41 constantly and because of the spiral formations in both gear and pinions, the latter will both be driven in one direction during the rotation of the axle in one direction and in the other direction during the opposite direction of rotation of said axle.

It will be seen however that the stop 2 always bars further sliding movement of one pinion while the other pinion moves its clutch member into the coacting clutch member with the result that the bevel pinion is driven and communicates its motion through the transmission shaft bevel pinion to said transmission shaft and driven machine and meanwhile the other pinion and opposite bevel gear are revolving idly, until the direction of rotation of the axle changes when they come into the active work in place of the others.

The hub 45 is formed with the reduced walls 48 at the ends, said walls being threaded externally at 49 and forming the annular recesses 50 between themselves and the axle 47. The radial dog slots 51 extend through the hub wall and are arranged in proximity to the inner ends of the recesses 50 in circumferential rows. The dogs 52 having the toothed or corrugated inner faces 53 and rounded backs 54 are inserted in the radial slots 51 and are engaged on said rounded heads by the wedge rings 55 having the inclined inner wall surfaces 56 and driven by wedge drivers 57 screwing on the threads 49 and having annular guide walls 58 forming bearing surfaces 59 on the axle 47, and extending into the recesses 50. The wedge drivers 57 in the periphery thereof have the spanner slots 60 and by means of a spanner the drivers are moved against the ring 55 and this ring engages the heads of the dogs and forces them to bite into the axle and thus perform the fixed mounting of the hub and driving gear on the axle and at the same time center the gear in relation to said axle and this is particularly important in railway car work where the axles are usually tapered.

The casing in the head and body portion in the vicinity of the driving gear is formed with the cavities 61, which offer temporary receptacles for the lubricating oil, that otherwise would travel as rapidly as the wheel and gain such force as would penetrate almost any packing. These cavities form interruptions and the oil therefrom flows back quietly to the bowl through the channels to be again picked up by the rotating wheels. The dust guards 63 and 64 are securely fastened to the casing around the hub 45 and abut the collar 65 which may be countersunk in the hub or form a part therewith as found more convenient in construction.

In the operation of this invention in particular reference to the lighting of steam railway cars the rotation of the car axle turns the main driving gear and this gear is wide enough across the toothed face to include always the two pinions in the meshing of the teeth.

The pinions are consequently always rotating during the rotation of the axle and the angle of the teeth in both pinions and driving gear insures the movement of one pinion into clutch with a bevel gear and the movement of the other against the central stop on the intermediate shaft. The reverse direction of rotations reverses the position of these pinions, thereby driving one bevel gear for the one direction of rotation of the axle and the other bevel gear for the other direction of axle rotation and as these bevels oppose one another and are both constantly in engagement with the bevel on the transmission shaft, the latter will always turn in the one direction, no matter which way the axle turns, and naturally the dynamo will be driven without interruption while the axle revolves and eliminates the necessity of a pole changer and its attendant troubles.

Another means of centering the hubs is shown in Figures 16 and 17 and in this the wedge pins 66 are formed with the heads 67 and tapered shanks 68 toothed on the inner surfaces 66 and these pins are driven in between the axle and the main driving gear hub 69 in the recesses 70, the toothed surfaces engaging the axle and the backs fitting closely to the beds of the recesses.

What we claim is:

1. In a power transmitting device, a driven gear and transmission shaft, a main driving gear and a suitably operated main shaft and an intermediate gear mechanism operatively connecting said driving gear and said driven gear and including a pair of oppositely disposed gears constantly in engagement with said driven gear and mounted on at the ends respectively of a transverse shaft and pinions slidably arranged on the transverse shaft and having teeth coacting with said driving gear in moving said pinions along said transverse shaft to one end gear or to the other end gear according to the direction of rotation of said driving gear for the purpose of clutching one or the other of said oppositely disposed gears and thereby maintain continuity of direction in the rotation of said transmission shaft.

2. In a power transmitting device, a transmission shaft, a main shaft and an intermediate shaft parallel with the main shaft, a main driving gear having its teeth formed at an angle to the axis, pinions slidably mounted on and keyed to said intermediate shaft and having their teeth formed at an angle to their axis and coacting with said main gear and separated by a central stop, opposing gears mounted on said intermediate shaft and adapted to clutch with said pinions respectively and a gear constantly engaged by said opposing gears and mounted on said transmission shaft.

3. In a power transmitting device, a transmission shaft, and a main shaft and intermediate shaft transversely arranged in relation to said transmission shaft, a main gear, pinions slidably keyed to said intermediate shaft and moved by said inner gear, a stop between said pinions, opposing gears respectively engaged by said pinions, and a transmission gear constantly engaged by said opposing gears.

4. In a power transmitting device, a main shaft suitably journalled and driven, a casing carried thereby, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

5. In a power transmitting device, a car axle forming a main shaft and supporting wheels therefor, a casing carried thereby, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

6. In a power transmitting device, a car axle forming a main shaft and supporting wheels therefor, a casing bearing on said axle and having shaft bearings formed in a lubricant bowl bottom, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

7. In a power transmitting device, a car axle forming a main shaft and driven by supporting wheels, a casing having a bowl forming a lubricant well, a cover reaching down to said well and forming bearings in a lower horizontal plane than said axle and a head closing in said cover and bowl and a part of said axle extending therethrough, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmision shaft journalled in said casing at right angles to said main shaft, and a transmission gear in constant engagement with said opposing gears.

8. In a power transmitting device, a car axle forming a main shaft and driven by supporting wheels, a casing formed of three parts and a cap, the lower part forming a lubricant bowl to the inside of the transmission shaft bearing and between the intermediate shaft bearings, the latter being below the axle level, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

9. In a power transmitting device, a car axle forming a main shaft and driven by supporting wheels, a casing formed in parts and having oil cavities and channels adjoining the gear chamber, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

10. In a power transmitting device, a car axle forming a main shaft and driven by supporting wheels, a casing enclosing part of the axle and gears, and having low set bearings lower than the axle level for the intermediate and transmission shafts, a main gear having teeth angular to its axis fixedly mounted on said shaft, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing gears having hubs forming the co-operating clutch members and in turn driven by a pinion aforesaid, a transmission shaft journalled in said casing at right angles to said main shaft, and a transmission gear in constant engagement with said opposing gears.

11. In a power transmitting device, a car axle forming part of the running gear and the main shaft of the drive, a casing enclosing the gears and a part of the axle, a main gear having teeth at an angle to its axis and rigid with a hub having its wall externally threaded and reduced from the inside forming a guide wall recess around the axle, dogs having toothed surfaces engaging said axle through radial slots in said hub, wedge rings engaging said dogs, drive rings screwed on to said threads and having a guide wall in said recess and adapted to drive said wedge rings on to said dogs, an intermediate shaft journalled in said casing and parallel to said main shaft and having a central collar forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing spiral gears having hubs forming the co-operating clutch members and in turn driven by a pinion aforesaid, a transmission shaft journalled in said casing at right angles to said main shaft, and a transmission gear in constant engagement with said opposing gears.

12. In a power transmitting device, a main shaft suitably journalled and driven, a casing carried thereby, a main gear having teeth angular to its axis fixedly mounted on said shaft, an intermediate shaft journalled in said casing and parallel to said main shaft and having a central annular flange forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, opposing spiral gears having hubs forming the co-operating clutch members and in turn driven by a pinion aforesaid, a transmission shaft journalled in said casing at right angles to said main shaft, and a transmission spiral gear in constant engagement with said opposing gears.

13. In a power transmitting device, a main shaft suitably journalled and driven, a casing carried thereby, a main gear having teeth angular to its axis fixedly mounted on said shaft, an intermediate shaft journalled in said casing and parallel to said main shaft and having a central annular flange forming a pinion stop, a pinion meshing with said main gear and slidably mounted on and keyed to said intermediate shaft on one side of said stop and forming a clutch member, a pinion meshing with said main gear and similarly mounted on the other side of said stop and forming a clutch member, co-operating clutch members having slanting backs to their teeth and shoulders immediately therebehind and fixedly mounted on said intermediate shaft and extending inwardly within the casing, spiral bevel gears fixedly mounted on said co-operating clutch members, and driven by a pinion aforesaid, a transmission shaft journalled in said casing at right angles to said main shaft, and a transmission gear in constant engagement with said opposing gears.

14. In a power transmitting device, a main shaft suitably journalled and driven, a casing carried thereby, a main gear having teeth angular to its axis fixedly mounted on said shaft, an intermediate shaft journalled in said casing and parallel to said main shaft and having a central collar forming a pinion stop, spiral pinions co-acting with said main gear and integral with clutch members and arranged to slide in key ways on either side of said collar respectively, opposing gears having hubs forming the co-operating clutch members and in turn driven by a pinion aforesaid, a transmission shaft journalled in said casing at right angles to said main shaft and a transmission gear in constant engagement with said opposing gears.

Signed at Hamilton, this 13th day of April, 1923.

THOMAS REID.
NORMAN TERRILL FINLAYSON.